US012366313B2

(12) United States Patent
Wu et al.

(10) Patent No.: US 12,366,313 B2
(45) Date of Patent: Jul. 22, 2025

(54) PLUMBING ASSEMBLY WITH A SWIVEL ADAPTER AND METHOD OF MANUFACTURING THE SAME

(71) Applicant: RELIANCE WORLDWIDE CORPORATION, Atlanta, GA (US)

(72) Inventors: Jun Wu, Zhejiang (CN); Haiming Liu, Zhejiang (CN); Michael John Kornegay, Marietta, GA (US); Clayton Pierce Boardman, IV, Atlanta, GA (US)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

(21) Appl. No.: 18/551,413

(22) PCT Filed: Mar. 25, 2021

(86) PCT No.: PCT/CN2021/082998
§ 371 (c)(1),
(2) Date: Sep. 20, 2023

(87) PCT Pub. No.: WO2022/198565
PCT Pub. Date: Sep. 29, 2022

(65) Prior Publication Data
US 2024/0167595 A1    May 23, 2024

(51) Int. Cl.
*F16L 27/08*    (2006.01)
*F16L 33/22*    (2006.01)

(52) U.S. Cl.
CPC ......... *F16L 27/0804* (2013.01); *F16L 33/223* (2013.01)

(58) Field of Classification Search
CPC . F16L 27/0804; F16L 33/223; F16L 19/0206; F16L 19/0212; F16L 19/0218; F16L 19/04
See application file for complete search history.

(56) References Cited

U.S. PATENT DOCUMENTS 235,580 A * 12/1880 Smith et al. ............ F16L 33/00
                                                   285/317
506,489 A * 10/1893 Gindele .................. F16L 19/04
                                                   285/353

(Continued)

FOREIGN PATENT DOCUMENTS

CN    202521092 U    11/2012
CN    202628703 U    12/2012

(Continued)

OTHER PUBLICATIONS

International Preliminary Report on Patentability; International Patent Application No. PCT/CN2021/082998; Sep. 12, 2023.

(Continued)

*Primary Examiner* — David Bochna
(74) *Attorney, Agent, or Firm* — Barnes & Thornburg LLP

(57) ABSTRACT

A hose assembly for use with a tankless water heater. The hose assembly includes a flexible hose, a first connector assembly, and a second connector assembly. The first connector assembly is fluidly coupled with the flexible hose and includes a first fitting. The first fitting is rotatably coupled with the first connector assembly such that the first fitting is independently rotatable relative to the flexible hose. The second connector assembly is fluidly coupled with the flexible hose opposite to the first connector assembly.

18 Claims, 13 Drawing Sheets

(56) References Cited

U.S. PATENT DOCUMENTS

| | | | |
|---|---|---|---|
| 2,730,382 A | | 1/1956 | de Mastri |
| 3,120,966 A | * | 2/1964 | Lyon .................... F16L 33/224 285/222.4 |
| 3,314,696 A | * | 4/1967 | Ferguson ............ F16L 37/0885 285/305 |
| 3,752,506 A | * | 8/1973 | Fouts ...................... F16L 33/16 285/179 |
| 3,900,221 A | * | 8/1975 | Fouts ................. F16L 27/0812 285/179 |
| 3,940,843 A | * | 3/1976 | Yeager ............... F16L 27/0804 285/354 |
| 4,186,946 A | * | 2/1980 | Snow .................... F16L 37/084 29/523 |
| 4,804,206 A | * | 2/1989 | Wood ................. F16L 27/0841 285/321 |
| 4,817,996 A | * | 4/1989 | Fouts ...................... F16L 33/01 285/305 |
| 4,993,755 A | * | 2/1991 | Johnston ............... F16L 37/133 285/422 |
| 5,340,168 A | * | 8/1994 | Barker ................. F16L 33/223 285/276 |
| 5,348,354 A | * | 9/1994 | Badoureaux .......... F16L 33/227 285/308 |
| 6,003,907 A | | 12/1999 | Gau et al. |
| 6,447,017 B1 | * | 9/2002 | Gilbreath .............. F16L 33/223 285/280 |
| 7,014,215 B2 | * | 3/2006 | Cooper ................. F16L 37/088 285/321 |
| 9,759,363 B2 | | 9/2017 | Seghi et al. |
| 2004/0212191 A1 | * | 10/2004 | Segal ..................... F16L 33/223 285/903 |
| 2009/0224536 A1 | * | 9/2009 | Fukushima ........... F16L 33/224 285/327 |
| 2014/0312610 A1 | * | 10/2014 | Chiang ................. F16L 33/223 285/89 |

FOREIGN PATENT DOCUMENTS

| | | |
|---|---|---|
| CN | 103998841 A | 8/2014 |
| CN | 208565898 U | 3/2019 |
| TW | 420594 U | 1/2012 |

OTHER PUBLICATIONS

Search Report and Written Opinion; International Patent Application No. PCT/CN2021/082998.

\* cited by examiner

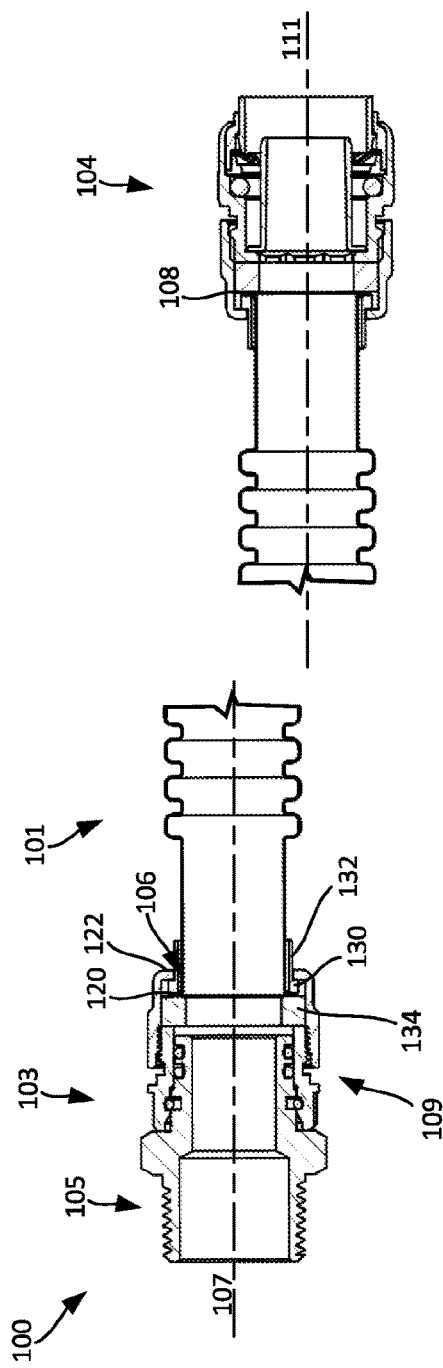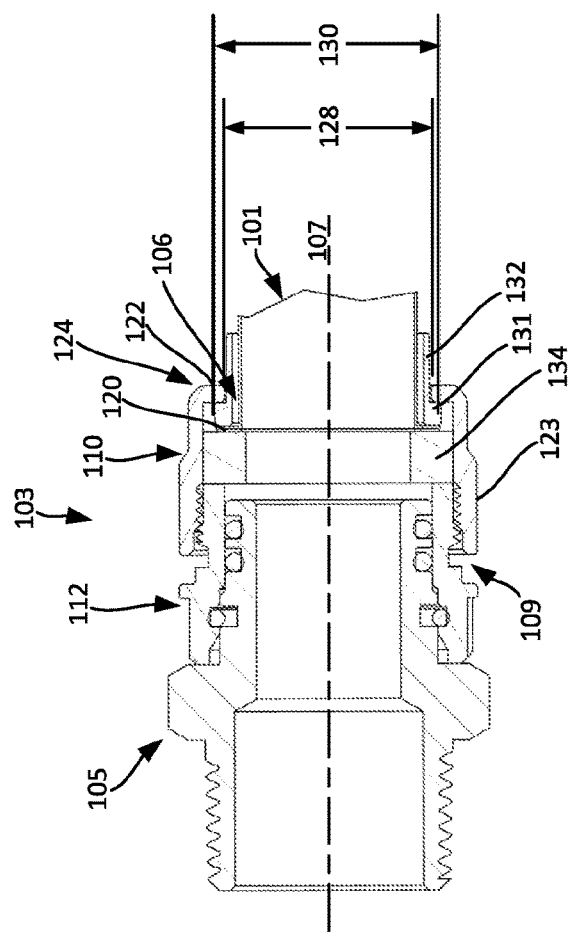
FIG. 3
FIG. 4

US 12,366,313 B2

PLUMBING ASSEMBLY WITH A SWIVEL ADAPTER AND METHOD OF MANUFACTURING THE SAME

PRIORITY CLAIM

This patent application is a U.S. National Phase of International Patent Application No. PCT/CN2021/082998, filed Mar. 25, 2021, the disclosure of which is incorporated herein by reference in its entirety.

BACKGROUND

The present disclosure relates generally to plumbing fixtures. More specifically, the present disclosure relates to a plumbing connection that allows for rotation between a plumbing fixture and a conduit.

Tankless water heaters, also known as demand-type or instantaneous water heaters, heat water directly without the use of a storage tank. When there is demand for hot water from the tankless water heaters, such as when a user turns on a hot water tap, cold water from a supply line flows into the tankless water heater. The cold water is heated by either a gas burner or an electric element. After the water is heated, hot water flows out of the tankless water and toward the plumbing fixture that has demanded the hot water.

In accordance with various building standards, municipal building codes, and/or other regulatory requirements or guidance, tankless water heaters are installed with a relief valve that relieves pressure from the tankless water heater. Also common are flush valves that allow a user to flush and clean the internals of the tankless water heater with a mild solvent, such as vinegar. These relief and/or flush valves (often purchased as combination "service valves") are often supplied with two female (internally threaded) ends. A first end is threaded to a male fitting (e.g., externally threaded nipple) and a second end is configured to receive a male fitting. When transitioning from the tankless water heater to the plumbing that extends throughout the house, various adapters may be needed to make the transition. For example, a home plumbed with copper pipes may require a threaded adapter configured for threadably coupling with the service valve and configured to receive a length of copper pipe. In some embodiments, a home plumbed with polymeric pipes (e.g., PVC, CPVC, PEX, etc.) may require a male thread to barbed adapter.

Some installations of tankless water heaters use a flexible hose to extend from the service valves to the supply line/house plumbing. However, these flexible hoses often require an adapter in order to be coupled with the service valve. Thus, there is a desire for a flexible hose that may be coupled with the service valve without requiring the use of an adapter.

SUMMARY

At least one embodiment relates to a hose assembly for use with a tankless water heater. The hose assembly includes a flexible hose, a first connector assembly, and a second connector assembly. The first connector assembly is fluidly coupled with the flexible hose and includes a first fitting. The first fitting is rotatably coupled with the first connector assembly such that the first fitting is independently rotatable relative to the flexible hose. The second connector assembly is fluidly coupled with the flexible hose opposite to the first connector assembly.

In some embodiments, the second connector includes a push-to-connect fitting.

In some embodiments, the first fitting is an externally threaded fitting configured for coupling with a threaded female threading.

In some embodiments, the flexible hose includes a first hose flange that extends radially away from an end of the flexible hose. The first connector assembly may further include a first adapter positioned at least partially about the flexible hose and a second adapter threadably coupled with the first adapter such that the first hose flange is positioned between the first adapter and the second adapter. A first sealing member may be compressed between the first adapter and the second adapter. The first sealing member is configured to provide a watertight engagement between the flexible hose and the first connector assembly.

In some embodiments, the first fitting is rotatably and fluidly coupled with the second adapter such that the first fitting and the second adapter are independently rotatable while maintaining the watertight engagement between the first fitting and the second adapter.

In some embodiments, the second adapter includes an adapter groove and the first fitting includes a fitting groove. The hose assembly may further include a retainer positioned within both the adapter groove and the fitting groove such that the retainer prevents axial movement of the first fitting relative to the second adapter.

In some embodiments, the first connector assembly further includes a first connector fluidly coupled to the flexible hose such that rotation of the first connector relative to the flexible hose is prevented. The first fitting may be rotatably coupled with the first connector such that the first fitting is rotatable relative to both the first connector and the flexible hose while maintaining a watertight engagement with the first connector.

In some embodiments, the hose assembly further includes a retainer coupled with both the first fitting and the first connector where the retainer extends circumferentially about the first fitting and prevents axial movement of the first fitting relative to the first connector.

In at least one embodiment, a plumbing assembly is provided. The plumbing assembly includes a conduit and a first connector assembly. The conduit includes a first conduit end. The first connector assembly is fluidly coupled with the conduit and defines a first axis. Both of the first connector assembly and at least a portion of the conduit are centered on the first axis. The first connector assembly includes a first connector and a first fitting. The first connector is fluidly coupled with the conduit such that the rotation of the conduit about the first axis relative to the first connector is prevented. The first fitting is rotatably coupled with the first connector such that rotation of the first fitting about the first axis relative to the first conduit end does not cause axial translation of the first fitting relative to the first connector along the first axis. A watertight seal is maintained between the first fitting and the first connector during rotation of the first fitting relative to the first connector.

In some embodiments, the first fitting includes a first portion and a second portion. The first portion extends into the first connector and forms the watertight seal with the first connector. The second portion is configured for coupling to a plumbing fitting.

In some embodiments, the second portion is an externally threaded nipple.

In some embodiments, the first portion includes a sealing groove and a sealing member. The sealing groove extends circumferentially about the first portion, and the sealing member is disposed within the sealing groove and configured to interface with the first connector to form the watertight seal. The sealing member is rotatable about the first axis such that the watertight seal is maintained when the first fitting is rotated relative to the first connector.

In some embodiments, the plumbing assembly further includes a retainer extending radially into both the first fitting and the first connector. The retainer is configured to facilitate rotational movement of the first fitting about the first axis relative to the first connector while inhibiting axial movement of the first fitting along the first axis relative to the first connector.

In some embodiments, the retainer is an external retaining ring.

In some embodiments, the retainer is formed of a metallic material.

In some embodiments, the conduit is a corrugated metal hose.

In at least one embodiment, a method of assembling a plumbing assembly is provided. The method includes fluidly coupling a first connector with a first end of a conduit such that rotation of the conduit relative to the first connector is prevented; positioning a retainer circumferentially within a coupling groove of a first fitting; and inserting the first fitting into the first connector until the retainer expands into a connector groove of the first connector, the retainer configured to allow rotation of the first fitting relative to the first connector without causing axial translation of the first fitting relative to the first connector.

In some embodiments, the method further includes positioning a sealing member within a sealing groove of the first fitting and engaging the sealing member with a sealing surface of the first connector such that the first fitting is rotatable relative to the first connector while maintaining a watertight seal between all of the sealing member, the sealing groove, and the sealing surface.

In some embodiments, the conduit includes a conduit flange extending radially away from the first end. The first connector may include a first adapter having and first adapter flange, a second adapter coupled with the first adapter; and a gasket. The step of fluidly coupling the first connector with the conduit may further include the steps of positioning a ring member and a sleeve about the first end of the conduit in confronting relation to the conduit flange, positioning the first adapter about the sleeve such that the ring member is interposed between the first adapter flange and the conduit flange, and coupling the second adapter with the first adapter to compress the gasket between the first adapter and the second adapter to form a watertight seal.

In some embodiments, the method further includes fluidly coupling a push-to-connect fitting to a second end of the conduit.

BRIEF DESCRIPTION OF THE FIGURES

The disclosure will become more fully understood from the following detailed description, taken in conjunction with the accompanying figures, wherein like reference numerals refer to like elements, in which:

FIG. 3 is a side, cross-sectional view of a plumbing assembly, according to an exemplary embodiment;

FIG. 4 is a detailed cross-sectional view of a portion of the plumbing assembly of FIG. 3, according to an example embodiment;

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a plumbing assembly is provided having a first connector assembly and a second connector assembly fluidly coupled together via a conduit (e.g., hose, flexible hose, pipe, rigid tube, etc.). Various plumbing fixtures, such as water heaters and clothes washing machines, include threaded couplings for connecting a supply line (e.g., hot and cold water lines) to the plumbing fixtures. Some conduits used for fluidly coupling the supply line to the plumbing fixture include flexible hoses. However, the limited flexibility of the conduit may still create difficulties when installing the first connector assembly and the second connector assembly to the supply line and the plumbing fixture. For example, some conduits include a threaded fitting that, once tightened to the recommended torque, limits or prohibits the rotation of the conduit relative to the threaded fitting. This may create problems when trying to connect the opposite side of the conduit to the supply line. Thus, there is a desire for a plumbing assembly that includes a conduit and allows the conduit to rotate relative to the fitting both when the fitting is coupled (e.g., fluidly coupled) to the supply line and/or plumbing fixture and when the fitting is not coupled to the supply line and/or plumbing fixture.

Figure 1:
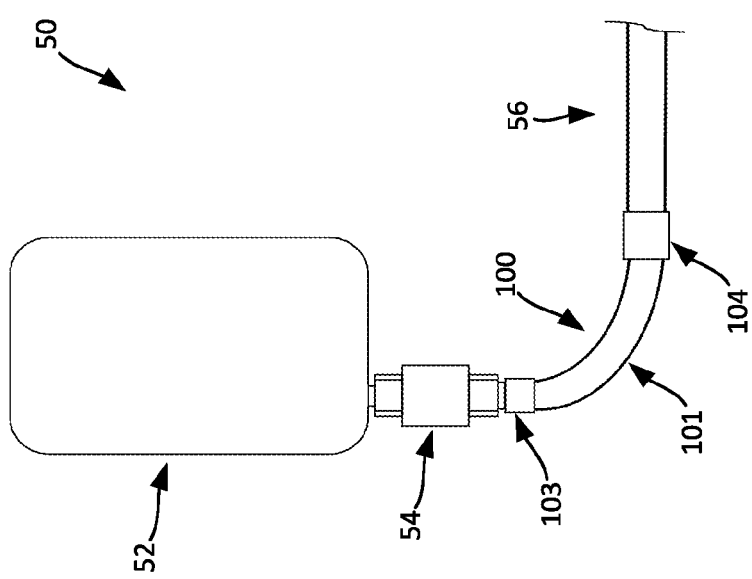
FIG. 1 is a front view of a plumbing system having a tankless water heater and a plumbing assembly, according to an example embodiment.

Referring now to FIG. 1, a plumbing fixture assembly 50 is shown, according to an example embodiment. The plumbing fixture assembly 50 includes a tankless water heater 52, a first service valve 54 (e.g., cold service valve) fluidly coupled to the tankless water heater 52, a supply line 56, and a plumbing assembly 100 fluidly coupled between the first service valve 54 and the supply line 56. A flow of water is provided from the supply line 56 to the tankless water heater 52 via the plumbing assembly 100. The plumbing assembly 100 includes a first connector assembly 103 fluidly coupled with the first service valve 54, a second connector assembly 104 fluidly coupled with the supply line 56, and a conduit 101 extending between and fluidly coupled with both the first connector assembly 103 and the second connector assembly 104. The conduit 101 may be flexible such that the conduit 101 may form a substantially 90 degree angle between the first service valve 54 and the supply line 56. The flexibility of the conduit 101 allows for flexibility in the orientation of the supply line 56 relative to the tankless water heater 52 such that the connection to the supply line may be in a plurality of directions.

Extending away from the tankless water heater 52 is a first pipe nipple 60. The first pipe nipple 60 may be externally threaded and configured for coupling with a female fitting of the first service valve 54. The first service valve 54 may further include a female fitting configured for coupling with the first connector assembly 103 of the plumbing assembly 100. In some embodiments, the first connector assembly 103 includes an externally threaded fitting for coupling with the first service valve 54. Often, such as when rigid pipes and fittings are used to facilitate a flow of water from the supply line 56 to the tankless water heater 52, an adapter is needed to convert the female fitting of the first service valve 54 to a barbed fitting or a female copper fitting. The plumbing assembly 100 provides the advantage of not requiring an adapter between the first service valve 54 and the first connector assembly 103. Instead, the first connector assembly 103 includes a fitting that corresponds with the first service valve 54. The fitting of the first connector 109 is rotatably coupled with the first connector assembly 103 such that the fitting is rotatable relative to the conduit 101 while maintaining a watertight engagement with the first connector assembly 103. Thus, the fitting of the first connector assembly 103 may be threadably coupled with the first service valve 54 without causing rotation of the conduit 101.

The second connector assembly 104 is configured for coupling with the supply line 56. In some embodiments, the second connector assembly 104 is a push-to-connect fitting configured to form a watertight engagement with the supply line 56 without the need for tools. In some embodiments, the second connector assembly 104 is similar to the first connector assembly 103. The supply line 56 may be a metallic pipe or a polymeric pipe, and the second connector assembly 104 may be configured to form a watertight engagement with the supply line 56 regardless of whether the supply line 56 is a metallic pipe or a polymeric pipe.

Figure 2:
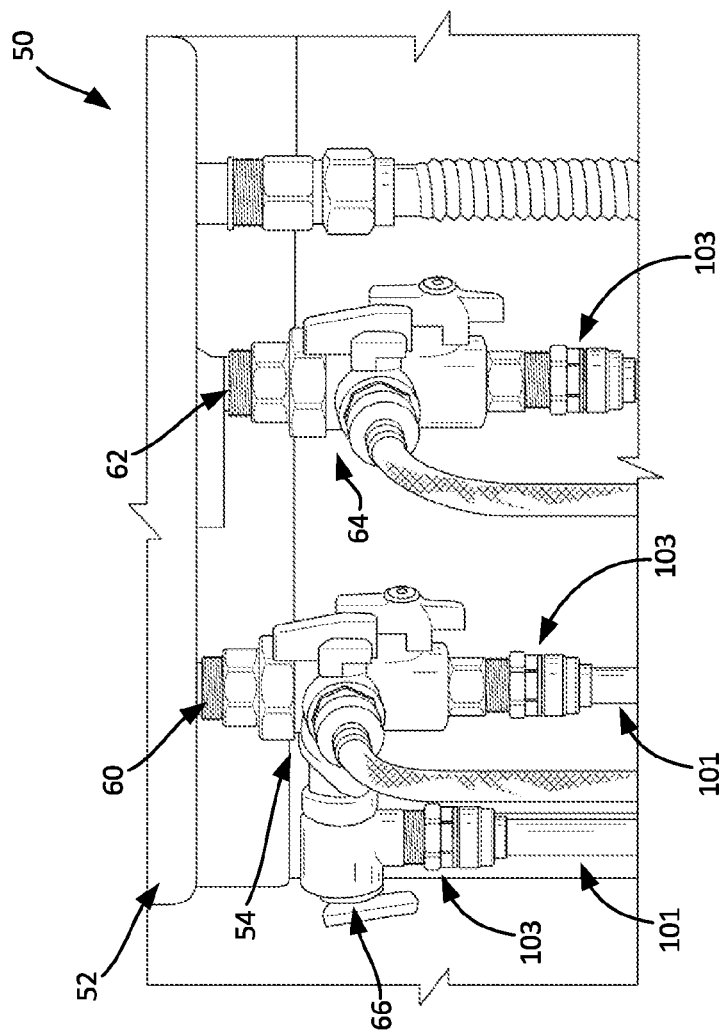
FIG. 2 is a detailed front view of the plumbing system of FIG. 1.

Referring now to FIG. 2, a detailed perspective view of the bottom of the tankless water heater 52 is shown, according to an example embodiment. The tankless water heater 52 includes the first pipe nipple 60 and a second pipe nipple 62 extending away from the tankless water heater 52 in a direction substantially similar to the first pipe nipple 60. The second pipe nipple 62 may be fluidly coupled with pressure relief valve 66 to provide relief of excess water pressure. A second service valve 64 may be provided which includes a female fitting configured for coupling with the second pipe nipple 62 and a female fitting configured for coupling with the plumbing assembly 100. The first pipe nipple 60 may be used for hot water whereas the second pipe nipple 62 may be used for cold water. In particular, the plumbing assembly 100 includes the first connector assembly 103 fluidly coupled with the second pipe nipple 62 which may be coupled with the cold water line of a house or building, and the second connector assembly 104 which may be fluidly coupled with a hot water line of a house or building. In some embodiments, the cold water supply may not be provided with a pressure relief valve but rather may be provided with a service valve for shutting off the water supply and/or allowing servicing (e.g., for descaling). In contrast, the first pipe nipple 60 used for hot water may be provided with both service and pressure relief valves. After the tankless water heater 52 heats up the water provided by the supply line 56, the tankless water heater outputs the heated water to the first pipe nipple 60 and to the plumbing assembly 100 fluidly coupled with the first service valve 54.

The plumbing assembly 100 fluidly coupled with the second service valve 64 is similar to the plumbing assembly 100 fluidly coupled with the first service valve 54. In some embodiments, the plumbing assembly 100 fluidly coupled with the second service valve 64 is identical to the plumbing assembly 100 coupled with the first service valve 54. For example, the second connector assembly 104 may be a push-to-connect fitting configured for coupling with PEX tubing that provides hot water to the plumbing fixtures (e.g., faucets, shower heads) of a home.

In some embodiments, the plumbing assembly 100 can be coupled with the pressure relief valve 66.

Referring to FIG. 3, a side, cross-sectional view of a plumbing assembly 100 is provided. The plumbing assembly 100 includes a conduit 101, a first connector assembly 103 coupled to a first end 106 of the conduit 101, and a second connector assembly 104 coupled to a second end 108 of the conduit 101, where the first end 106 is opposite to the second end 108. The conduit 101 may be a flexible hose, a rigid hose, a pipe, or the like. The conduit 101 may vary in length, from the relatively short lengths of tubing used for the installation of tankless water heaters to the relatively long lengths of hose used for garden hoses. In some embodiments, the conduit 101 is a corrugated hose, a braided hose, a rubber hose, or the like. The conduit 101 may be manufactured from a polymeric material, a metallic material, a synthetic material, an organic material, or any combination thereof.

The first connector assembly 103 is fluidly coupled with the first end 106 of the conduit 101 and is in fluid communication with the conduit 101. The first connector assembly 103 also defines a first axis 107 (e.g., central axis) where both the first connector assembly 103 and at least a portion of the first end 106 are centered along the first axis 107. In some embodiments, the inner surfaces of both the first connector assembly 103 and the first end 106 are concentric about the first axis 107. The first connector assembly 103 includes a first connector 109 and a first fitting 105. The first fitting 105 is configured for coupling to a plumbing fitting, such as a fitting for a plumbing fixture or a supply line. In some embodiments, the first fitting 105 is configured for coupling with a service valve of a tankless water heater. For example, the first fitting 105 may be a male fitting (e.g., male threaded fitting, externally threaded fitting) configured for threadably coupling with a female pipe nipple or a female fitting of a service valve (e.g., the first service valve 54, the second service valve 64). In some embodiments, the first fitting is a female fitting (e.g., female threaded fitting, internally threaded fitting) for coupling with a male fitting or male pipe nipple.

When coupling the plumbing assembly 100 with a plumbing fixture or plumbing fitting, the first fitting 105 may be rotated without rotating (e.g., without causing the rotation of) either of the first connector 109 or the conduit 101. For example, an installer my use a wrench to engage the first fitting 105 and thread the first fitting 105 with a plumbing fixture while holding the conduit 101 substantially stationary. In some embodiments, when coupling the first fitting 105 with a plumbing fixture, such as a tankless water heater, rotation of the conduit 101 may be cumbersome or impossible. The first connector 109 allows for rotation of the first fitting 105 relative to the conduit 101 while maintaining a watertight engagement between all of the conduit 101, the first fitting 105, and the first connector 109. When the first fitting 105 is coupled with a plumbing fitting, the first connector 109 is configured to allow rotation of the conduit 101 relative to both the first fitting 105 and the plumbing fitting without causing translational movement of the first connector 109 relative to the first fitting 105 along the first axis 107. When the first fitting 105 is fluidly coupled with another fitting, the conduit 101 is configured for rotation about the first axis 107 relative to the first fitting 105 without the need for tools (e.g., with less than about 5 Nm of torque applied) and without causing translational movement of the conduit 101 along the first axis 107 relative to the first fitting 105.

The first connector 109 further includes a first adapter 110 (e.g., adapter nut) and a second adapter 112 (e.g., swivel nut) coupled with the first adapter 110. The first adapter 110 and the second adapter 112 cooperate to couple the first end 106 of the conduit 101 with the first connector assembly 103. The first end 106 may include a first conduit flange 120 extending radially away from the conduit 101 proximate to the first end 106. The first conduit flange 120 allows for compression of a watertight seal against a surface thereof, e.g., such that the seal is compressed between the flange 120 and the second adapter 112. As used herein, "watertight" refers to watertight and substantially watertight interfacings between components.

Figure 7:
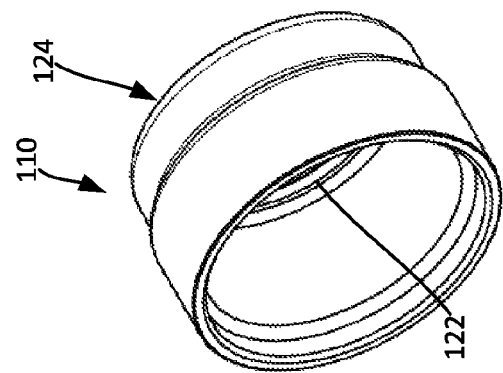
FIG. 7 is a perspective view of the first adapter of FIG. 5.
Figure 6:
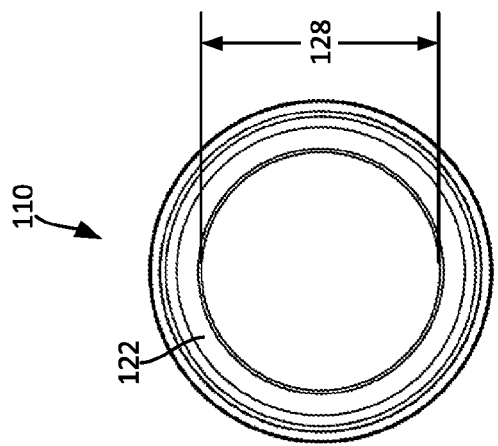
FIG. 6 is a front view of the first adapter of FIG. 5.
Figure 5:
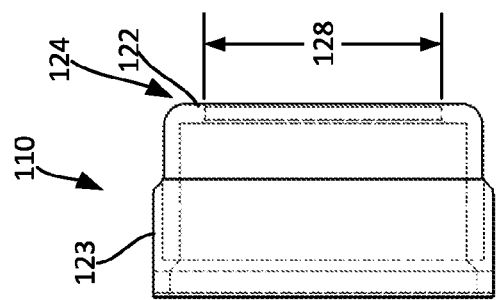
FIG. 5 is a side view of a first adapter of the portion of the plumbing assembly of FIG. 4.

Referring now to FIG. 4, a detailed, side cross-sectional view of the first connector assembly 103 is shown. The first adapter 110 includes a first adapter flange 122 extending inwardly from a first end 124 of the first adapter 110 and toward the first axis 107. The first adapter flange 122 defines a first diameter 128 less that a second diameter 130 of the first conduit flange 120. The first adapter flange 122 is configured to prevent movement of the conduit 101 along the first axis 107 relative to the first adapter 110. Turning now to FIG. 5, a side view of the first adapter 110 is shown. The first adapter 110 may include a tooling surface 123 configured to receive a tool for providing torque to the first adapter 110 about the first axis 107. Turning now to FIG. 6, a top view of the first adapter 110 is shown. The first adapter flange 122 may be formed with the first adapter 110, such as by forging, swaging, machining, casting, and the like. In some embodiments, the first end 106 is inserted into the first end 124 before the first adapter flange 122 is formed, and then the first adapter flange 122 is bent (e.g., rolled, formed, etc.) radially inwardly toward the first axis 107. Referring now to FIG. 7, a perspective view of the first adapter 110 is shown. In some embodiments, the first adapter 110 includes threads (e.g., internal threads, external threads, etc.) for coupling with the second adapter 112. In some embodiments, the second adapter 112 includes external threads and is configured to self-tap into the inner surface of the first adapter 110. In some embodiments, the first adapter 110 and the second adapter 112 are coupled with adhesives. The first adapter 110 may be formed of a variety of materials, including polymeric materials, metallic materials, and other synthetic materials or a combination thereof.

Figure 10:
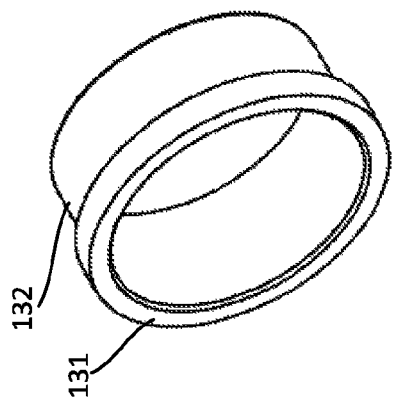
FIG. 10 is a perspective view of the sealing member and the sleeve of FIG. 9.
Figure 9:
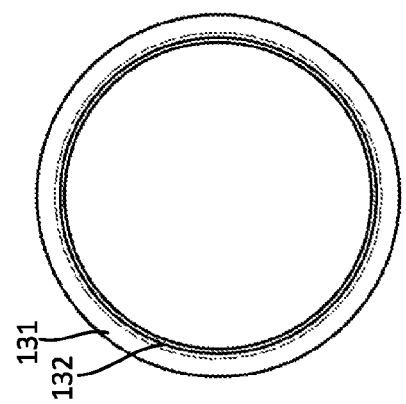
FIG. 9 is a front view of the ring member and the sleeve of FIG. 8.
Figure 8:
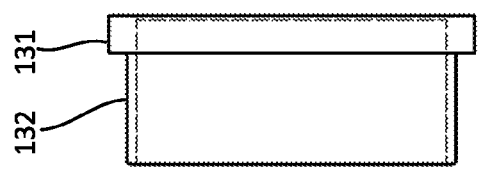
FIG. 8 is a side view of a ring member and a sleeve of the portion of the plumbing assembly of FIG. 4.

Referring back to FIG. 4, the plumbing assembly 100 further includes an annular ring member 131 positioned between the first adapter flange 122 and the first conduit flange 120. The ring member 131 is configured to separate the first adapter 110 and the first conduit flange 120 such that the first adapter 110 and the first conduit flange 120 are prevented from interfacing. In some embodiments, a sleeve 132 is coupled with the ring member 131 and extends away from the ring member 131 in a direction generally away from the second adapter 112. In some embodiments, the ring member 131 and the sleeve 132 are formed as a single body. The sleeve 132 is configured to prevent contact between the first adapter 110 and the conduit 101. In some embodiments, the ring member 131 and the sleeve 132 are formed of one or more dielectric (e.g., electrically insulating) materials, such as rubber, nylon, plastic, and the like, or a combination thereof. Turning now to FIG. 8, a side view of the ring member 131 and the sleeve 132 is shown. The sleeve 132 defines a diameter less than the first diameter 128 such that the sleeve 132 may extend through the first end 124 and be in confronting relation to the first adapter flange 122. Referring to FIG. 9, a top view of the ring member 131 and the sleeve 132 is shown. In some embodiments, the ring member 131 is formed of a rubber that is overmolded with the sleeve 132. For example, the ring member 131 may be made of a compressible material (e.g., an elastomer) and the sleeve 132 may be formed of a comparatively less elastic material, such as PVC or nylon. FIG. 10 shows a perspective view of the ring member 131 and the sleeve 132.

Figure 13:
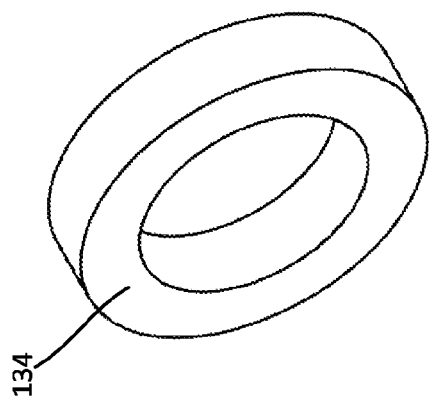
FIG. 13 is a perspective view of the sealing member of FIG. 9.
Figure 12:
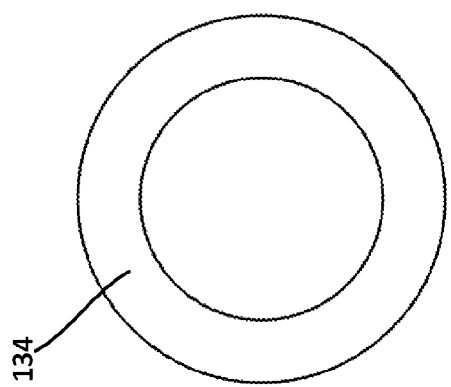
FIG. 12 is a front view of the sealing member of FIG. 11.
Figure 11:
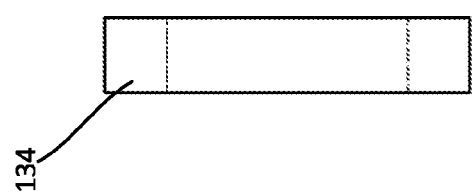
FIG. 11 is a side view of a sealing member of the portion of the plumbing assembly of FIG. 4.

Referring back to FIG. 4 once more, the plumbing assembly 100 further includes a first sealing member 134 (e.g., gasket, O-ring, etc.) that is positioned between the first conduit flange 120 and the second adapter 112. The first sealing member 134 may be a gasket, an O-ring, a hose washer, or the like. The first sealing member 134 forms a watertight seal between the second adapter 112 and the first conduit flange 120. Referring to FIGS. 11-13, a side view (FIG. 11), a top view (FIG. 12), and a perspective view (FIG. 13) of the first sealing member 134 are shown. In some embodiments, the first sealing member 134 formed of the same material as the ring member 131.

When the first adapter 110 and the second adapter 112 are coupled together, the first sealing member 134 is compressed (e.g., squeezed) between the first conduit flange 120 and the second adapter 112. The first conduit flange 120 may be arranged between the ring member 131 and the first sealing member 134 to form a watertight interface between all of the first adapter 110, the second adapter 112, and the conduit 101. The first sealing member 134 may deform slightly under the compression force. In some embodiments, the first adapter 110 and the second adapter 112 are threadably coupled to one another such that rotation of the first adapter 110 relative to the second adapter 112 results in translational movement between the first adapter 110 and the second adapter 112, the translational movement causing a compression of at least the first sealing member 134. In some embodiments, the first adapter 110 and the second adapter 112 are compressed together and then permanently coupled to one another, such as by soldering, brazing, welding, and the like. In some embodiments, the first adapter 110 and the second adapter 112 are formed together of a single piece and coupled to the conduit 101 through a series of manufacturing steps, including crimping, bending, compressing, and welding. In some embodiments, the first adapter 110 and the second adapter 112 are coupled together such that the first end 106 is prevented from rotating about the first axis 107 relative to either of the first adapter 110 and the second adapter 112.

Figure 14:
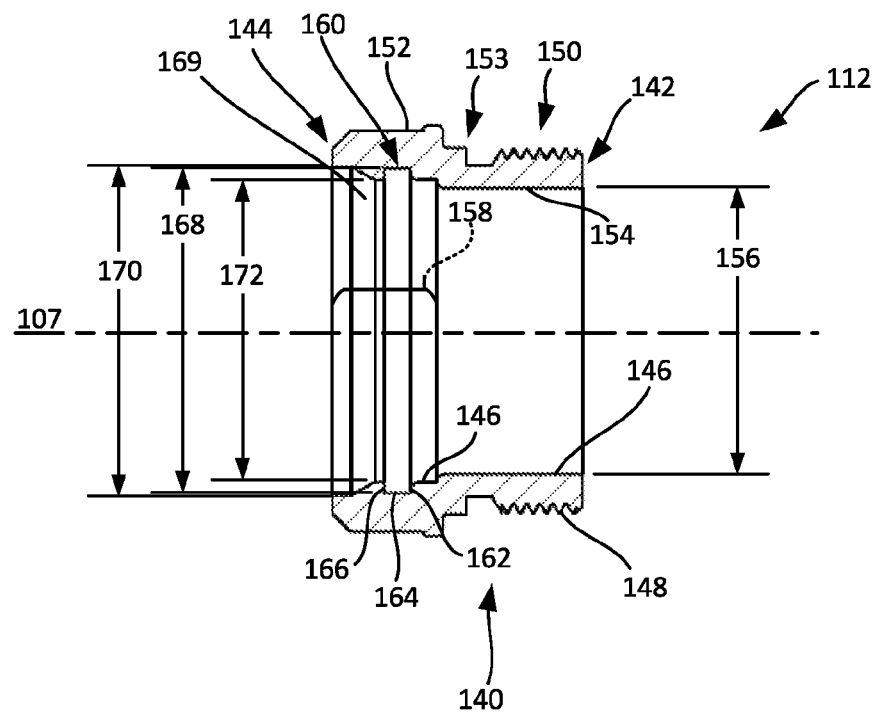
FIG. 14 is a side, cross-sectional view of a second adapter of the plumbing assembly of FIG. 4.
Figure 15:
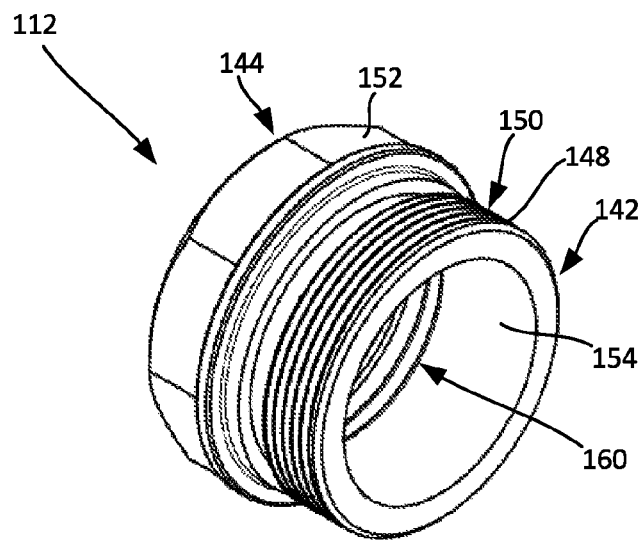
FIG. 15 is a perspective view of the second adapter of FIG. 14.

Referring now to FIG. 14, a side, cross-sectional view of the second adapter 112 is shown. The second adapter 112 is configured for coupling with the first fitting 105 such that the first fitting 105 is configured to rotate about the first axis 107 relative to the second adapter 112 without causing translational movement of the first fitting 105 along the first axis 107 relative to the second adapter 112. For example, if the first fitting 105 is coupled to a supply line, such as by a threaded engagement, the first connector 109 and the first end 106 and configured to rotate together about the first axis 107 relative to the first fitting 105. In contrast, a threaded fitting, such as a bolt or threaded pipe fitting, allows for two components to rotate relative to one another while simultaneously causing axial translational movement between the two components.

The second adapter 112 includes a substantially annular body 140 having a first end 142, a second end 144, an inner surface 146, and an outer surface 148. Extending radially away from the outer surface 148 proximate to the first end 142 is a first coupling member 150. The first coupling member 150 is configured for coupling with the first adapter 110. In some embodiments, the first coupling member 150 is a threaded body configured for threadably coupling with the first adapter 110. In some embodiments, the first coupling member 150 is a smooth, annular surface configured for soldering and/or crimping with the first adapter 110.

Positioned proximate to the second end 144 is a tooling surface 152 that extends circumferentially about the second adapter 112. As shown in FIG. 14, the tooling surface 152 may define a substantially hexagonal profile configured for receiving a wrench, spanner, pliers, or other tool. In some embodiments, the tooling surface 152 may define a substantially octagonal profile (e.g., FIG. 16, FIG. 17). Extending circumferentially about the second adapter 112 are three annular surfaces that decrease in diameter between the tooling surface 152 and the first coupling member 150. These three surfaces are shown as stepped surfaces 153. The stepped surfaces 153 decrease in diameter as the stepped surfaces 153 extend from the tooling surface 152 to the first coupling member 150. Proximate to the tooling surface 152, the stepped surfaces 153 define a diameter that is greater than the diameter of the tooling surface 152. Proximate to the first coupling member 150, the stepped surfaces 153 define a diameter that is less than a diameter of the first coupling member 150. In some embodiments, a glue is interposed between the first adapter 110 and the second adapter 112 before the first adapter 110 is coupled with the second adapter 112. When the first adapter 110 and the second adapter 112 are threaded together, some of the glue may be pushed out and into the stepped surfaces 153.

The inner surface 146 of the second adapter 112 includes an annular sealing surface 154. The sealing surface 154 is configured to form a sealing engagement (e.g., radial sealing engagement) with the first fitting 105. The sealing surface 154 terminates proximate to the first end 142. In some embodiments, the sealing surface 154 extends from the first end 142 to a midpoint between the first end 142 and the second end 144. The sealing surface 154 defines a third diameter 156.

The inner surface 146 further includes a receiving surface 158 contiguous with the sealing surface 154 and extending from the second end 144 to the sealing surface 154. The receiving surface 158 includes an annular groove 160 (e.g., retainer groove, circlip groove, etc.) that extends radially outward from the first axis 107 and into the annular body 140. The groove 160 extends circumferentially about the inner surface 146 and is configured to facilitate coupling of the first fitting 105 with the second adapter 112. In some embodiments, the groove 160 receives a portion of the first fitting 105. The groove 160 is defined by a first groove surface 162, a second groove surface 164, and a third groove surface 166.

Referring again to FIG. 14, the first groove surface 162 is concentric with the first axis 107 and is substantially perpendicular to the sealing surface 154. In some embodiments, the first groove surface 162 is contiguous with the sealing surface 154. In some embodiments, a portion of the inner surface 146 is positioned between the first groove surface 162 and the sealing surface 154. The second groove surface 164 is concentric about the first axis 107 and is substantially parallel to (e.g., concentric with) the sealing surface 154. The second groove surface 164 is contiguous with both the first groove surface 162 and the third groove surface 166. The second groove surface 164 defines a fourth diameter 168 greater than the third diameter 156. The third groove surface 166 is parallel to the first groove surface 162 and is concentric about the first axis 107.

Figure 16:
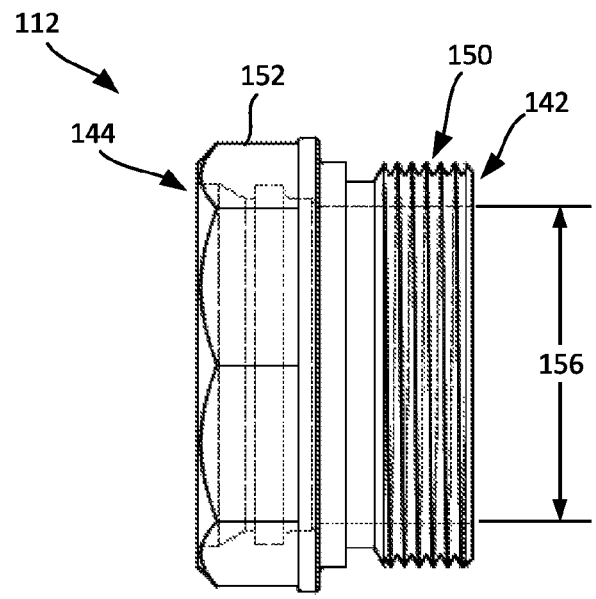
FIG. 16 is a side view of the second adapter of FIG. 14.
Figure 17:
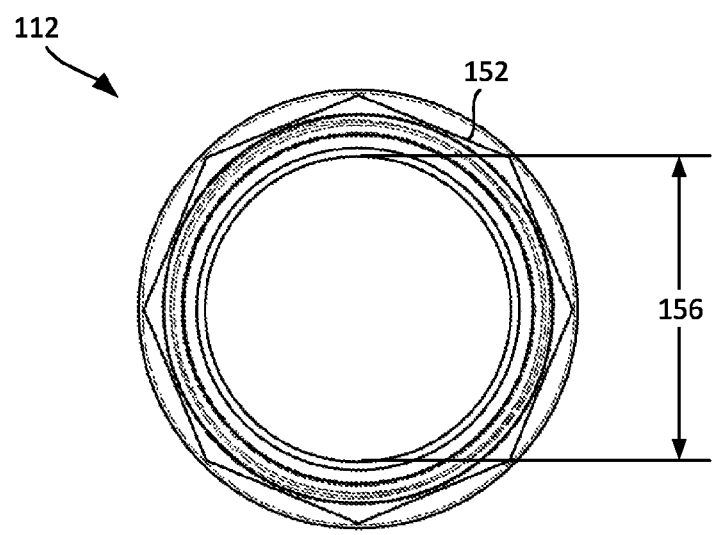
FIG. 17 is a front view of the second adapter of FIG. 14.

The inner surface 146 further includes a tapered surface 169 (e.g., a ramped surface or frustoconical surface) that tapers from a fifth diameter 170 proximate to the second end 144 to a sixth diameter 172 proximate to the groove 160, where the fifth diameter 170 is greater than the sixth diameter 172. In some embodiments, the tapered surface 169 terminates at the second end 144 and is contiguous with the third groove surface 166. In some embodiments, such as is shown in FIG. 14, a portion of the inner surface 146 extends between the second end 144 and the tapered surface 169, and a portion of the inner surface 146 extends between the tapered surface 169 and the third groove surface 166. The tapered surface 169 is configured to interface with a portion of the first fitting 105 to bias the portion of the first fitting 105 into the groove 160. The fifth diameter 170 is greater than the sixth diameter 172, and the fourth diameter is greater than the sixth diameter 172. In some embodiments, the fifth diameter 170 is greater than the fourth diameter 168. In some embodiments, the fifth diameter is approximately equal to the fourth diameter 168. In some embodiments, the fifth diameter is slightly less than the fourth diameter 168. The slope of the tapered surface 169 may be varied based upon the properties of the first connector 109, such as the dimensions and the materials used. Referring now to FIG. 16, a side view of the second adapter 112 is shown. The second end 144 of the second adapter 112 is configured to receive the first fitting 105 when the plumbing assembly 100 is assembled. Turning to FIG. 17, a top view of the second adapter 112 is shown.

Figure 18:
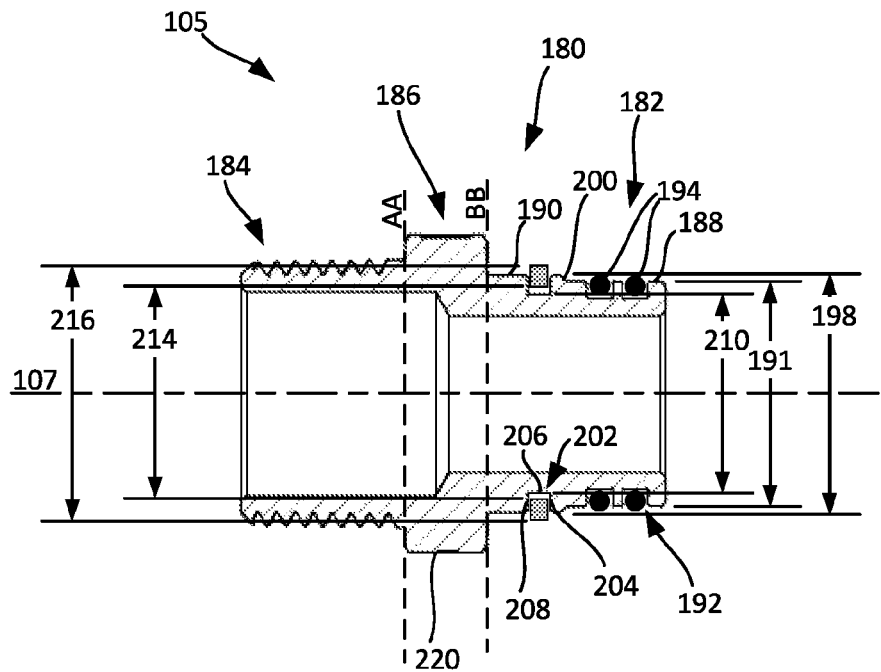
FIG. 18 is a side, cross-sectional view of a fitting of the plumbing assembly of FIG. 4.

Referring now to FIG. 18, a cross-sectional view of the first fitting 105 is shown. The first fitting 105 is configured to be rotatably coupled with the second adapter 112 while maintaining a watertight engagement with the second adapter 112. In some embodiments, the first fitting 105 is rotatably coupled with the second adapter 112 such that the first fitting 105 is able to complete multiple complete rotations (e.g., more than 360 rotational degrees) about the first axis 107 relative to the second adapter 112 while maintaining a watertight engagement between the first fitting 105 and the second adapter 112. The first fitting 105 maintains a watertight engagement with the second adapter 112 while being fluidly coupled with a plumbing fitting (e.g., supply line, plumbing fixture, water heater, or threaded fitting of a tankless water heater, valve connected thereto, etc.). The first fitting 105 defines a substantially annular body 180 having a first portion 182 and a second portion 184. The first portion 182 is received by the second end 144 of the second adapter 112 and the second portion 184 is configured for coupling with a plumbing fitting. The first portion 182 and the second portion 184 are separated by a third portion 186 interposed between the first portion 182 and the second portion 184. The dotted lines AA and BB demarcate the approximate boundaries between the first portion 182, the second portion 184, and the third portion 186 which are shown for purposes of illustration. In various embodiments, the locations of and/or relative distances between the first portion 182, second portion 184 and third portion 186 may vary.

Figure 19:
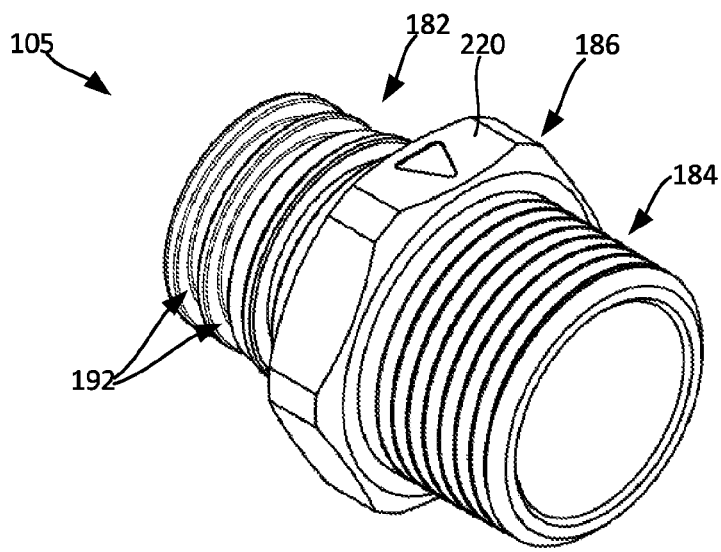
FIG. 19 is a perspective view of the fitting of FIG. 18.

In some embodiments, the first portion 182 defines multiple annular surfaces, shown as a first fitting surface 188 and a second fitting surface 190. The first fitting surface 188 defines a seventh diameter 191. In some embodiments, the seventh diameter 191 is approximately equal to, though slightly less than, the third diameter 156 of the sealing surface 154. In some embodiments, the first fitting surface 188 forms a slip-fit with the sealing surface 154. In some embodiments, the first fitting surface 188 is interrupted by a circumferential sealing groove 192 configured to receive a second sealing member 194. In some embodiments, such as shown in FIG. 19, the first fitting surface 188 is interrupted by a plurality of sealing grooves 192 (e.g., two sealing grooves 192) having a plurality of second sealing members 194 received circumferentially within the plurality of sealing grooves 192. When the first portion 182 is positioned within the second adapter 112, the plurality of second sealing members 194 are compressed against the sealing surface 154 and form a radial, watertight seal between the first portion 182 and the second adapter 112.

The second fitting surface 190 is concentric with the first fitting surface 188 and defines an eighth diameter 198. As shown, the eighth diameter 198 is greater than the seventh diameter 191 and a tapered surface 200 is interposed between the first fitting surface 188 and the second fitting surface 190 to transition between the seventh diameter 191 and the eighth diameter 198. In some embodiments, the seventh diameter 191 and the eighth diameter 198 are approximately equivalent. The first fitting surface 188 and the second fitting surface 190 may be configured to interface with assembly equipment to hold the first fitting 105 while the plurality of second seal members 194 are positioned within the plurality of sealing grooves 192. Interrupting the second fitting surface 190 is a coupling groove 202 (e.g., retainer groove, circlip groove, etc.) that extends circumferentially about the first portion 182 and extends radially into the annular body 180 toward the first axis 107. The coupling groove 202 is defined by a first groove surface 204, a second groove surface 206, and a third groove surface 208.

Referring to FIG. 18, the exemplary groove surfaces of the coupling groove 202 are described in more detail below. The first groove surface 204 is concentric about the first axis 107 and perpendicular to the second fitting surface 190. The second groove surface 206 is concentric with both the second fitting surface 190 and the first axis 107. The second groove surface 206 is also contiguous with both the first groove surface 204 and the third groove surface 208. The second groove surface 206 defines a ninth diameter 210 that is less than the eighth diameter 198. In some embodiments, the ninth diameter 210 is less than both the eighth diameter 198 and the seventh diameter 191. The third groove surface 208 is parallel to the first groove surface 204 and is contiguous with both the second groove surface 206 and the second fitting surface 190.

The first fitting 105 further includes a retainer 212. In some embodiments, the retainer 212 includes a retaining ring, retainer, circlip, spring clip, etc. received within the coupling groove 202. In some embodiments, the first fitting 105 does not include the coupling groove 202, and the retainer 212 may include one or more detents, ball detents, and the like configured to expand between the eighth diameter 198 and a diameter greater than the eighth diameter 198 in response to an external force.

Figure 21:
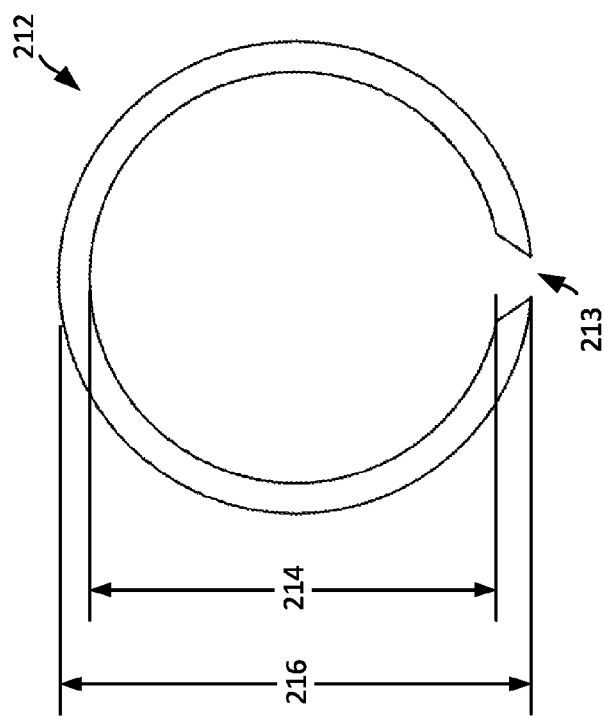
FIG. 21 is a top view of the fitting of FIG. 18.
Figure 20:
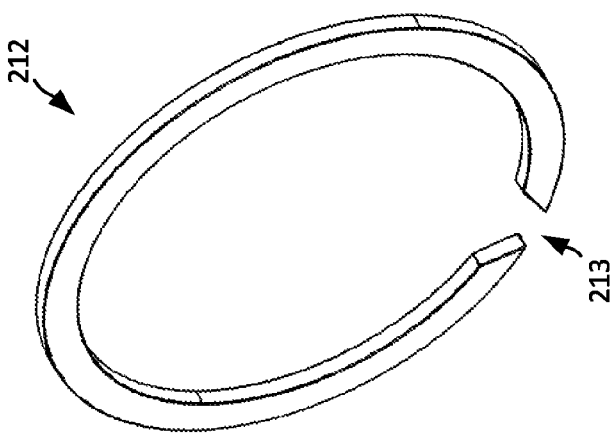
FIG. 20 is a side view of the fitting of FIG. 18.

Referring to FIGS. 20 and 21, the retainer 212 is shown, according to an example embodiment. As shown in FIG. 20, the retainer 212 is an external retainer ring having a gap 213 defined there in that allows for flexure of the retainer 212. Specifically, the gap 213 allows the retainer 212 to elastically (e.g., reversibly) deform, allowing for a reduction of the inner diameter 214 and the outer diameter 216. The retainer 212 may be formed of a metallic material, a polymeric material, or a combination of the two. In some embodiments, instead of the gap 213, the retainer 212 is an external spring retainer ring, where two ends of the spring retainer ring overlap and are configured to translate relative to one another as the retainer 212 is biased to a smaller diameter. In some embodiments, such as when the retainer 212 is a retaining ring, the retainer 212 may maintain a substantially constant cross-section about the circumference of the retaining ring. In some embodiments, such as shown in FIG. 18, the retainer 212 includes a rectangular cross-section. In some embodiments, such as shown in FIG. 3, the retainer 212 is configured to maintain a circular cross-section. The retainer 212 fits within the coupling groove 202 between the first groove surface 204 and the third groove surface 208. The retainer 212 defines an inner diameter 214 and an outer diameter 216. The inner diameter 214 is greater than the ninth diameter 210 and less than the eighth diameter 198. The outer diameter 216 is greater than the eighth diameter 198.

When the first fitting 105 is coupled with the second adapter 112, the first portion 182 is inserted into the second adapter 112 via the second end 144. As the first portion 182 extends further into the second adapter 112, the plurality of second sealing members 194 interface with the sealing surface 154. At the same time, the retainer 212 interfaces with the tapered surface 169. In some embodiments, such as when the retainer 212 is a retainer ring, the retaining ring travels along the tapered surface 169 and is compressed to a smaller diameter (e.g., such that both the inner diameter 214 and the outer diameter 216 thereof are less than in their pre-compression state). Specifically, the outer diameter 216 is compressed until the outer diameter is approximately equal to, but less than, the sixth diameter 172. In some embodiments, such as when the retainer 212 is a detent or ball detent, the detent slides or rolls along the tapered surface 169 while being pulled radially into the first fitting 105 and being compressed to a smaller effective diameter, where the effective diameter is defined by a circle connecting the most distal points of the detents from the first axis 107.

The retainer 212 is sized such that the outer diameter 216 (or in the instance of a detent, effective diameter) may be substantially equal to the sixth diameter 172 while the inner diameter 214 is greater than the ninth diameter 210. Once the retainer 212 passes the tapered surface 169, the retainer 212 expands within the groove 160 such that the outer diameter 216 is greater than the sixth diameter 172 and the inner diameter 214 is less than the eighth diameter 198. When the retainer 212 is positioned within the groove 160, the retainer 212 prevents axial movement of the first fitting 105 relative to the second adapter 112 and the conduit 101. A substantially watertight seal may be maintained between the first fitting 105 and the second adapter 112 (e.g., between the first portion 182 and the sealing surface 154). In particular, the retainer 212 may substantially inhibit most or all such axial movement, although a minimal range of motion may remain, subject to manufacturing tolerances.

In some embodiments, such as when the retainer 212 is a retaining ring, the coupling between the first fitting 105 and the second adapter 112 may be irreversible without damage to the first fitting 105, the second adapter 112, or the retainer 212, though disassembly may be possible, either with a tool or manually, without damage to the first fitting 105, the second adapter 112, or the retainer 212. In some embodiments, such as when the retainer 212 is a detent, coupling between the first fitting 105 and the second adapter 112 is configured to be reversible, either with a tool or manually.

Figure 22:
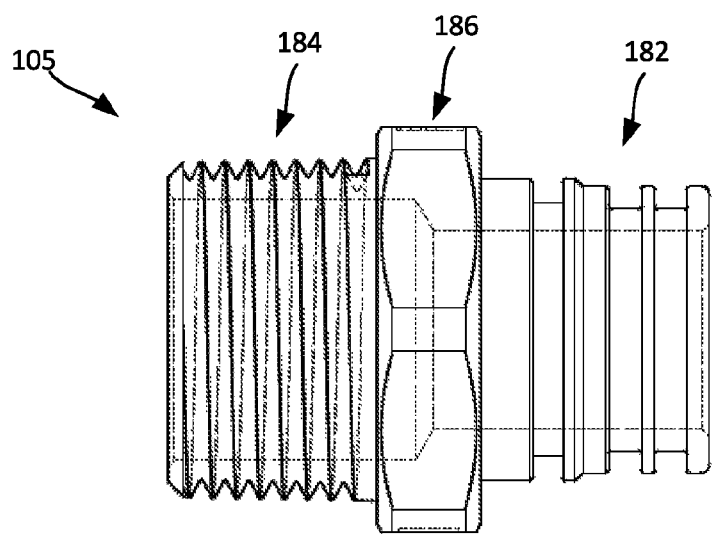
FIG. 22 is a perspective view of a retainer of the portion of the plumbing assembly of FIG. 4.

Referring now to FIG. 22, a side view of the first fitting 105 is shown without the retainer 212. The second portion 184 of the first fitting 105 may include any of a variety of fittings configured to form a watertight engagement with another fitting. In some embodiments, the second portion 184 of the first fitting 105 is a threaded male adapter having tapered threads (e.g., NPT threads), as shown in FIG. 22. In some embodiments, the second portion 184 includes tapered threads. The second portion 184 may be a female adapter configured to receive a corresponding male-end adapter. In some embodiments, the second portion 184 is a push-to-connect fitting.

Figure 23:
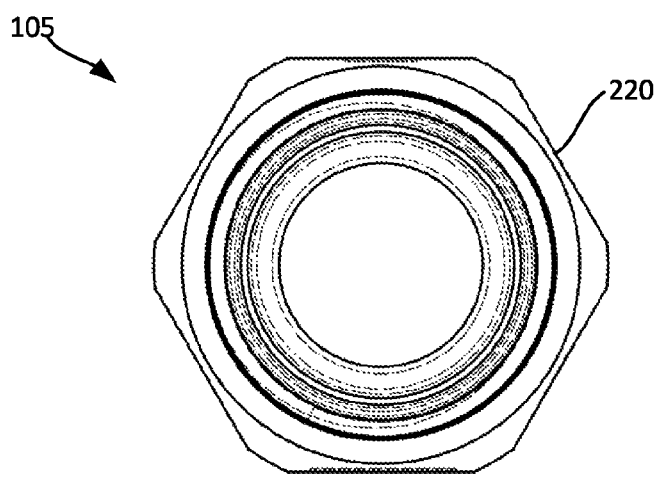
FIG. 23 is a front view of the retainer ring of FIG. 22.

Referring now to FIG. 23, a top view of the first fitting 105 is shown. The third portion 186 includes a tooling surface 220 configured to receive a tool, such as a wrench, spanner, pliers, and the like. In some embodiments, such as when the second portion 184 is a push-to-connect fitting, the third portion 186 may not be needed and the first portion 182 may be contiguous with the second portion 184. In some embodiments, the tooling surface 220 is substantially hexagonal and configured to be interfaced with a wrench. In some embodiments, the third portion 186 is formed of a material that is different from the materials used to for the first portion 182 and the second portion 184. For example, the third portion 186 may be formed of a metallic material configured to transfer the torque applied to the tooling surface 220 to the second portion 184. The second portion 184 may be formed of plastic, rubber, or a combination thereof. For example, if the second portion 184 is a push-to-connect fitting, the second portion 184 may be formed of a combination of plastics, rubbers, and metals.

Figure 24:
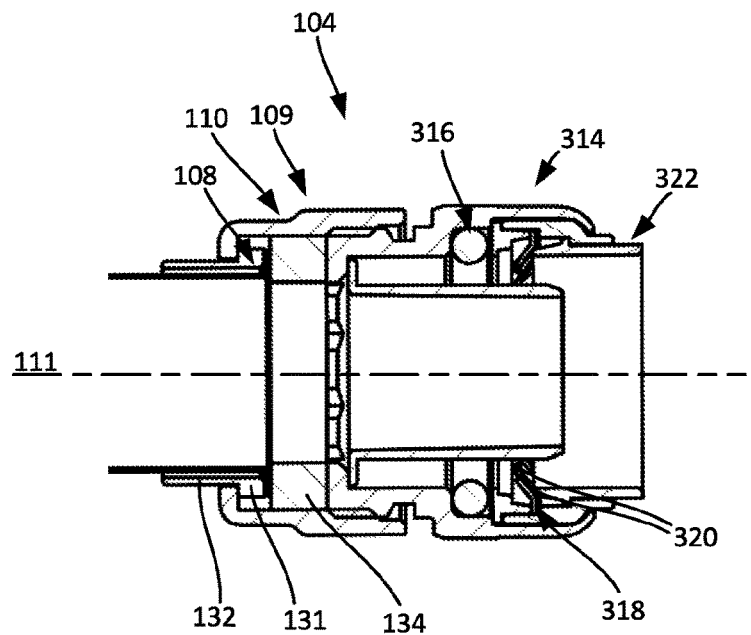
FIG. 24 is a detailed cross-sectional view of a portion of the plumbing assembly of FIG. 3, according to another example embodiment.

Referring now to FIG. 24, the second connector assembly 104 is shown coupled to the second end 108. The second connector assembly 104 defines a second axis 111. Both the second connector assembly 104 and at least a portion of the second end 108 are centered on the second axis 111. In some embodiments, the second connector assembly 104 and the second end 108 are concentric about the second axis 111. In some embodiments, the second connector assembly 104 is substantially similar to the first connector assembly 103. The second connector assembly 104 includes the first connector 109 and a second fitting 314. A difference between the first connector assembly 103 and the second connector assembly 104 is that the first connector 109 and the second fitting 314 are integrally formed such that rotation of the second fitting 314 about the second axis 111 translates to a proportional rotation of the second end 108 about the second axis 111. More specifically, the second fitting 314 is coupled with the first adapter 110, where the ring member 131, the sleeve 132, and the first sealing member 134 cooperate to form a watertight seal between the first adapter 110 and the second fitting 314.

As shown in FIG. 24, the second fitting 314 is a push-to-connect fitting configured to receive a conduit, such as a copper pipe, PEX pipe, PVC pipe, PERT pipe, CPVC pipe, and the like. While the second fitting 314 is unable to be rotated relative to the second end 108, the second fitting 314 is configured to facilitate rotation of a conduit within the second fitting 314 while maintaining a watertight engagement with the conduit. Specifically, the second fitting 314 includes a sealing member 316 configured to form a watertight seal with an outer surface of the conduit when the conduit is inserted within the second fitting 314. In some embodiments, the second fitting 314 includes a grab ring 318 with a plurality of teeth 320 configured to engage an outer surface of the conduit. The grab ring 318 allows the conduit to be pushed into the second fitting 314 but inhibits the conduit from being removed from the fitting (e.g., allows movement in one axial direction and inhibits movement in the opposite axial direction). The second fitting 314 also includes a release portion 322 configured to be activated (e.g., by a tool or manually) to engage and release the grab ring 318 to allow for removal of the conduit. Example push to connect fittings are described in U.S. Pat. Nos. 10,072,783, 9,228,681, 8,322,755, U.S. Provisional Patent No. 62/718,562 (PCT/US2019/025851), and U.S. patent application Ser. No. 17/200,277, the disclosures and figures of which are specifically incorporated by reference herein as if set forth in their entireties.

In some embodiments, the second fitting 314 includes other types of fittings, including but not limited to, press fittings, sweat connections, crimp connection fittings, cold expansion fittings, male or female threaded fittings, etc.

Figure 25:
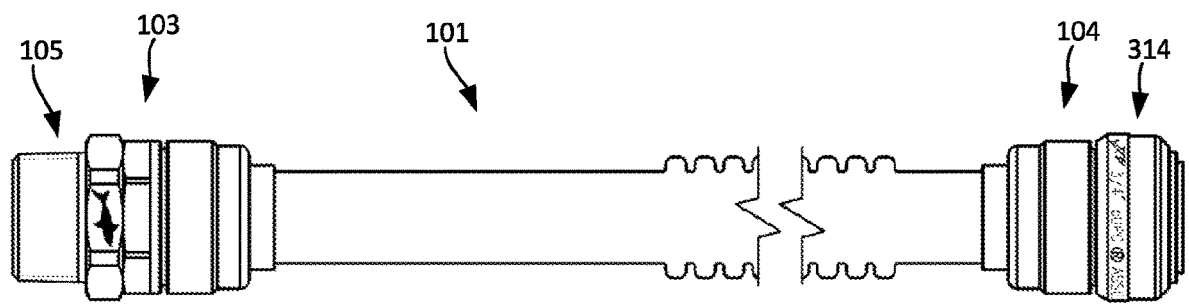
FIG. 25 is a side view of the plumbing assembly of FIG. 3, according to an example embodiment.

Referring now to FIG. 25, a side view of the plumbing assembly 100 is shown. While the plumbing assembly 100 is outlined above as including a corrugated conduit, it should be understood that the plumbing assembly 100 is not limited to corrugated conduits. In some embodiments, the first connector assembly 103 and the first fitting 105 may be coupled to a supply line and configured for coupling with a plumbing assembly have corresponding fitting.

Figure 26:
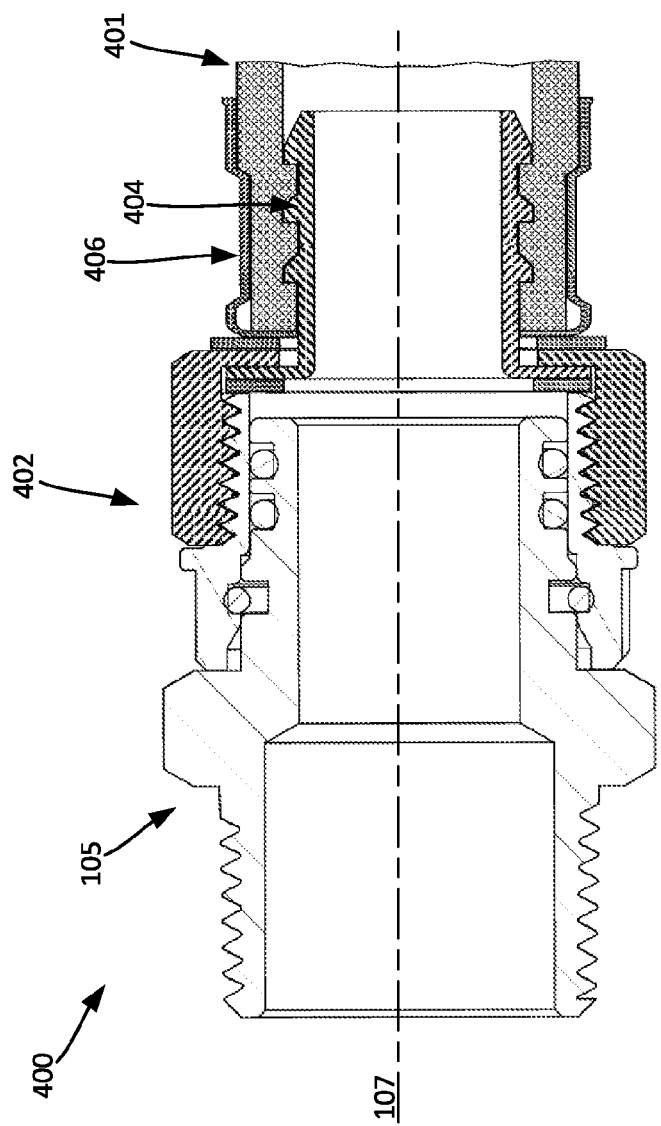
FIG. 26 is a side cross-sectional view of a plumbing assembly, according to another example embodiment.

Referring now to FIG. 26, a plumbing assembly 400 is shown, according to an example embodiment. The plumbing assembly 400 is similar to the plumbing assembly 100. Accordingly, like numbering is used to denote like parts between the plumbing assembly 100 and the plumbing assembly 400. A difference between the plumbing assembly 400 and the plumbing assembly 100 is that the plumbing assembly 400 includes a barbed coupling for fluidly coupling a conduit to the first fitting 105.

In some embodiments, the plumbing assembly 400 includes a conduit 401, a first connector assembly 402 fluidly coupled to the conduit 401, and the first fitting 105. The conduit 401 may be a flexible hose, such as a braided hose or a rubber hose. The first connector assembly 402 includes a barbed, male coupling 404 (e.g., male hose coupling) that extends into an end of the conduit 401 and mechanically couples the first connector assembly 402 with the conduit 401. An end cap 406 may be positioned about the end of the conduit 401 and crimped to facilitate coupling between the coupling 404 and the conduit 401. The first connector assembly 402 is similar to the first connector assembly 103 in that the first connector assembly 402 includes the first fitting 105 rotatably coupled ad fluidly coupled to the first connector assembly 402 such that the first fitting 105 is rotatable relative to the first connector assembly 402 without causing translational movement of the first fitting 105 relative to the first connector assembly 402.

Further, the first fitting 105 is rotatably coupled to the first connector assembly 402 such that the first fitting 105 maintains a watertight engagement with the first connector assembly 402 when the first fitting 105 is rotated relative to the first connector assembly 402. While the first fitting 105 is shown as an externally threaded male fitting, it should be understood that the first fitting 105 may include an internally threaded female fitting configured for coupling to a male fitting of a plumbing fixture. In some embodiments, the first fitting 105 is a push-to-connect fitting. In some embodiments, the first connector assembly 402 is fluidly coupled with the second fitting 314.

Figure 27:
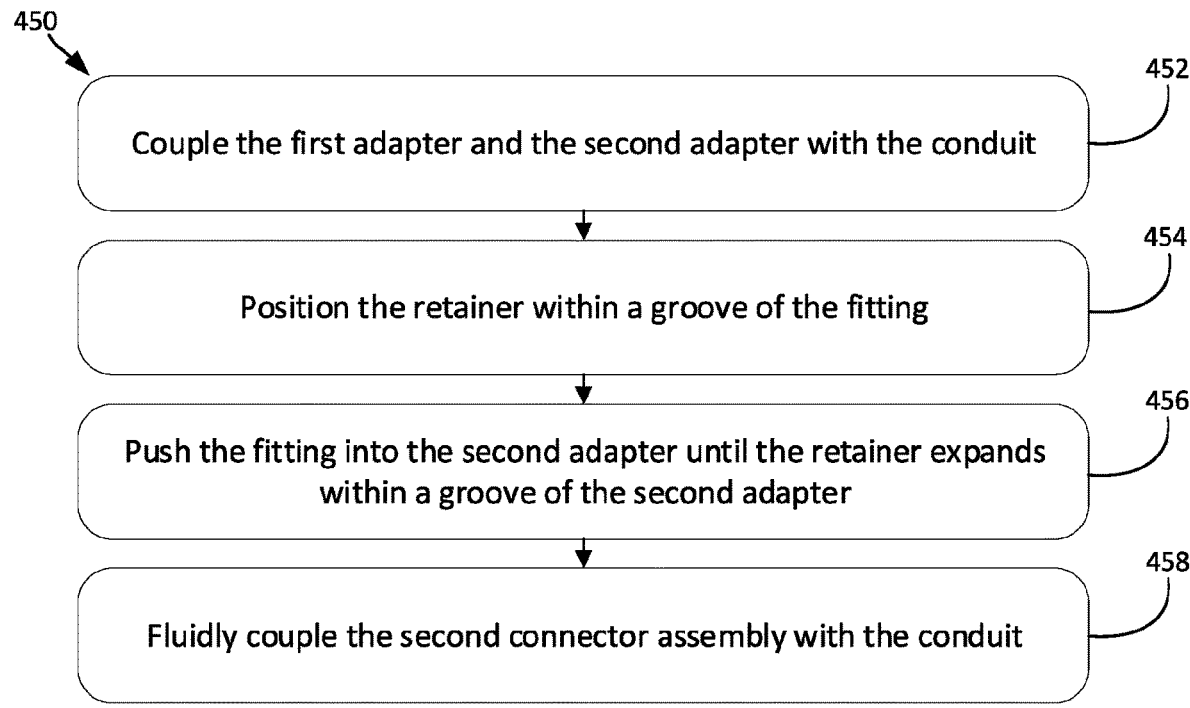
FIG. 27 is a flow diagram of a method of assembling a plumbing assembly, such as the plumbing assembly of FIG. 3, according to an example embodiment.

Referring now to FIG. 27, a flow diagram depicting a method 450 of assembling the plumbing assembly 100 is shown, according to an example embodiment having exemplary operations 452-458. At 452, the first connector 109 is coupled with the first end 106 of the conduit 101. The compression of the first sealing member 134 between the second adapter 112 and the first conduit flange 120 forms a watertight seal between the first connector 109 and the conduit 101.

At 454, the retainer 212 is positioned within the coupling groove 202 of the first fitting 105. In some embodiments, the retainer 212 is a C-shaped external retainer ring that is pushed into the coupling groove 202.

At 456, the first fitting 105 is positioned within the second adapter 112 such that the plurality of second sealing members interface with the sealing surface 154 and such that the retainer 212 is positioned within the groove 160. In some embodiments, the first fitting 105 is pushed into the second adapter 112 such that the retainer 212 interfaces with the tapered surface 169. As the retainer 212 moves along the tapered surface 169, the tapered surface 169 biases the retainer 212 to a smaller diameter such that the retainer 212 may enter the groove 160. The retainer 212 expands to a larger (e.g., the original, the resting) diameter once the retainer 212 is positioned within the groove 160.

At 458, the second connector assembly 104 is fluidly coupled with the second end 108 of the conduit 101. In some embodiments, the second connector assembly 104 is substantially similar to the first connector assembly 103 and is installed using a similar method. In other words, steps 452-456 are repeated at 458. In some embodiments, the second connector assembly 104 is a push-to-connect fitting.

Figure 28:
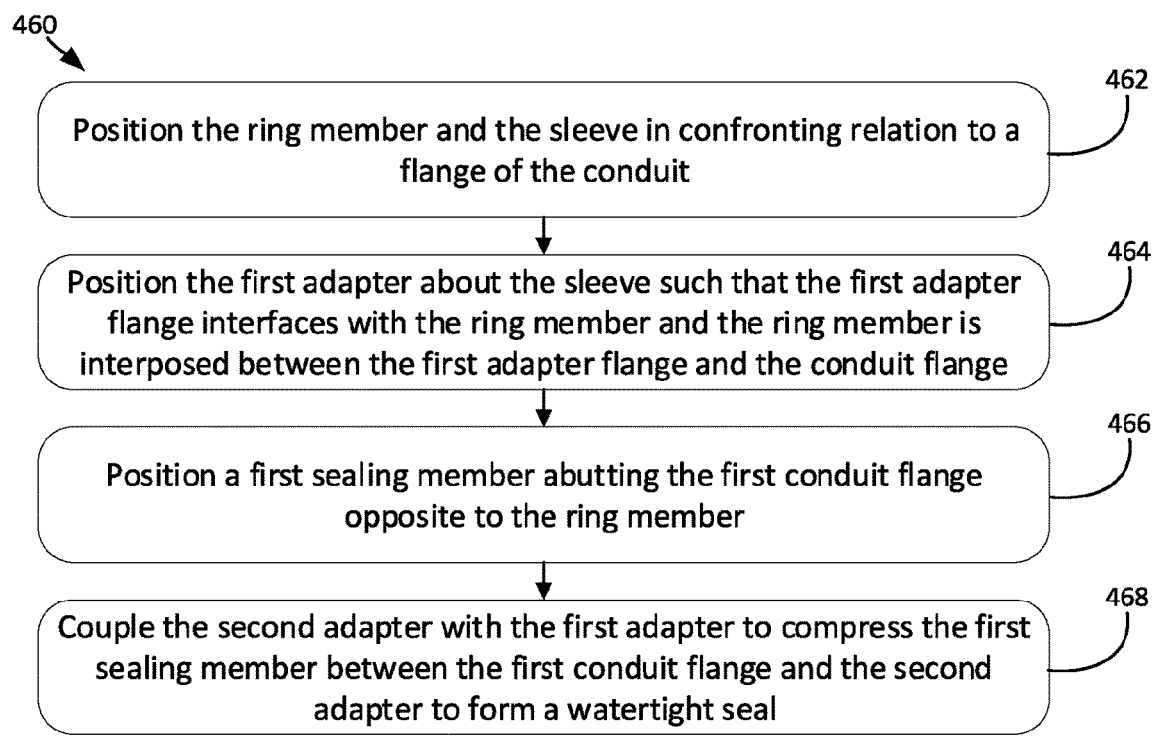
FIG. 28 is a flow diagram of a method of assembling a portion of the plumbing assembly of FIG. 27, according to an example embodiment.

Referring now to FIG. 28, a flow diagram depicting a method 460 of coupling the first adapter 110 and the second adapter 112 with the conduit 101 is shown, according to an example embodiment. At 462, the ring member 131 and the sleeve 132 are positioned about the first end 106 of the conduit 101 such that the ring member 131 is in confronting relation to the first conduit flange 120.

At 464, the first adapter 110 is positioned about the sleeve 132 such that the first adapter flange 122 interfaces with the ring member 131 and such that the ring member 131 is interposed between the first adapter flange 122 and the first conduit flange 120. The sleeve 132 is interposed between the first adapter flange 122 and the conduit 101.

At 466, a first sealing member 134 is positioned abutting the first conduit flange 120 opposite to the ring member 131.

At 468, the second adapter 112 is coupled with the first adapter 110 such that the first sealing member 134 is compressed between the second adapter 112 and the first conduit flange 120. The first sealing member 134 forms a watertight seal between the conduit 101 and the first connector 109.

As utilized herein with respect to numerical ranges, the terms "approximately," "about," "substantially." and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While at least one embodiment has been described, such description is presented by way of example only and not by way of limitation. The subject matter described herein may be embodied in a variety of other forms; furthermore, various omissions, substitutions and changes in the form of any embodiment described herein may be made without departing from the spirit of the disclosure. The accompanying claims and their equivalents are intended to cover such embodiments or modifications as would fall within the scope and spirit of the disclosure.

What is claimed is:

1. A hose assembly configured to be communicated with a tankless water heater, the hose assembly comprising:
    a flexible hose;
    a first connector assembly fluidly coupled with the flexible hose;
    a first fitting including a first portion, a second portion, and a third portion, the third portion being a flange positioned between the first and second portions, wherein the first and second portions are aligned along a center axis, the first portion of the first fitting configured to be received by an end of the first connector assembly, the second portion of the first fitting configured to be fluidly coupled with a plumbing fitting, and the first fitting being rotatably coupled with the first connector assembly such that the first fitting is rotatable 360 degrees about the center axis relative to the first connector assembly while maintaining a water tight engagement between the first fitting and the first connector assembly, wherein the first fitting is independently rotatable relative to the flexible hose; and
    a second connector assembly fluidly coupled with the flexible hose opposite to the first connector assembly;
    wherein the flexible hose includes a first hose flange extending radially away from an end of the flexible hose; and
    the first connector assembly further comprises:
        a first adapter positioned at least partially about the flexible hose;
        a second adapter having threads that threadably couple the second adapter with the first adapter such that the first hose flange is positioned between the first adapter and the second adapter, the second adapter having an outer stepped surface adjacent to the threads; and
        a first sealing member compressed between the first adapter and the second adapter and configured to provide a watertight engagement between the flexible hose and the first connector assembly.

2. The hose assembly of claim 1, wherein the second connector assembly includes a push-to-connect fitting.

3. The hose assembly of claim 1, wherein the first fitting is an externally threaded fitting configured for coupling with a threaded female fitting.

4. The hose assembly of claim 1, wherein the first fitting is rotatably and fluidly coupled with the second adapter such that the first fitting and the second adapter are independently rotatable while maintaining the watertight engagement between the first fitting and the second adapter.

5. The hose assembly claim 1, wherein:
    the second adapter includes an adapter groove;
    the first fitting includes a fitting groove; and
    the hose assembly further comprises:
        a retainer positioned within both the adapter groove and the fitting groove, the retainer preventing axial movement of the first fitting relative to the second adapter.

6. The hose assembly of claim 1, wherein the first connector assembly further comprises:
    a first connector fluidly coupled to the flexible hose such that rotation of the first connector relative to the flexible hose is prevented,
    wherein the first fitting is rotatably coupled with the first connector such that the first fitting is rotatable relative to both the first connector and the flexible hose while maintaining a watertight engagement with the first connector.

7. The hose assembly of claim 6, further comprising a retainer coupled with both the first fitting and the first connector, the retainer extending circumferentially about the first fitting and preventing axial movement of the first fitting relative to the first connector.

8. A plumbing assembly comprising:
    a conduit and a first conduit end; and
    a first connector assembly fluidly coupled to the conduit and defining a first axis, both of the first connector assembly and at least a portion of the conduit being centered on the first axis, the first connector assembly comprising:
        a first connector fluidly coupled with the conduit such that rotation of the conduit about the first axis relative to the first connector is prevented; and
        a first fitting including a first portion, a second portion, and a third portion, the third portion being a flange positioned between the first and second portions, wherein the first and second portions are aligned along the first axis, the first portion of the first fitting configured to be received by an end of the first connector, the second portion of the first fitting configured to be fluidly coupled with a plumbing fitting, and the first fitting being rotatably coupled with the first connector such that rotation of the first fitting about the first axis relative to the first conduit end does not cause axial translation of the first fitting relative to the first connector along the first axis, wherein the first fitting is rotatable 360 degrees about the first axis relative to the first connector while maintaining a water tight engagement between the first fitting and the first connector
    wherein the first connector assembly further comprises:
        a first adapter positioned at least partially about a flexible hose;
        a second adapter having threads that threadably couple the second adapter with the first adapter such that a first hose flange of the flexible hose is positioned between the first adapter and the second adapter, the second adapter having an outer stepped surface adjacent to the threads; and
        a first sealing member compressed between the first adapter and the second adapter and configured to provide a watertight engagement between the flexible hose and the first connector assembly.

9. The plumbing assembly of claim 8, wherein the second portion is an externally threaded nipple.

10. The plumbing assembly of claim 8, wherein the first portion comprises:
    a sealing groove extending circumferentially about the first portion; and
    the first sealing member being disposed within the sealing groove and configured to interface with the first connector to form a watertight seal, the first sealing member rotatable about the first axis such that the watertight seal is maintained when the first fitting is rotated relative to the first connector.

11. The plumbing assembly of claim 8, further comprising a retainer extending radially into both the first fitting and the first connector, the retainer configured to facilitate rotational movement of the first fitting about the first axis relative to the first connector while inhibiting axial movement of the first fitting along the first axis relative to the first connector.

12. The plumbing assembly of claim 11, wherein the retainer is an external retaining ring.

13. The plumbing assembly of claim 11, wherein the retainer is formed of metallic material.

14. The plumbing assembly of claim 8, wherein the conduit is a corrugated metal hose.

15. A method of assembling a plumbing assembly, the method comprising:
fluidly coupling a first connector with a first end of a conduit such that rotation of the conduit relative to the first connector is prevented:
positioning a retainer circumferentially within a coupling groove of a first fitting; and
inserting the first fitting into the first connector until the retainer expands into a connector groove of the first connector, the retainer configured to allow rotation of the first fitting relative to the first connector without causing axial translation of the first fitting relative to the first connector;
wherein the first fitting includes a first portion, a second portion, and a third portion, the third portion being a flange positioned between the first and second portions, wherein the first and second portions are aligned along a center axis, the first portion of the first fitting configured to be received by an end of the first connector, the second portion of the first fitting configured to be fluidly coupled with a plumbing fitting; and
wherein the first fitting is rotatable 360 degrees about the center axis relative to the first connector while maintaining a water tight engagement between the first fitting and the first connector;
wherein:
the conduit includes a conduit flange extending radially away from the first end;
the first connector includes:
a first adapter having and first adapter flange;
a second adapter coupled with the first adapter; and
a gasket;
fluidly coupling the first connector with the conduit comprises the steps of:
positioning a ring member and a sleeve about the first end of the conduit in confronting relation to the conduit flange;
positioning the first adapter about the sleeve such that the ring member is interposed between the first adapter flange and the conduit flange; and
coupling the second adapter with the first adapter to compress the gasket between the first adapter and the second adapter to form a watertight seal.

16. The method of claim 15, further comprising:
positioning a sealing member within a sealing groove of the first fitting, and
engaging the sealing member with a sealing surface of the first connector such that the first fitting is rotatable relative to the first connector while maintaining a watertight seal between all of the sealing member, the sealing groove, and the sealing surface.

17. The method of claim 15, further comprising fluidly coupling a push-to-connect fitting to a second end of the conduit.

18. A method of assembling a plumbing assembly, the method comprising:
fluidly coupling a first connector with a first end of a conduit such that rotation of the conduit relative to the first connector is prevented:
positioning a retainer circumferentially within a coupling groove of a first fitting; and
inserting the first fitting into the first connector until the retainer expands into a connector groove of the first connector, the retainer configured to allow rotation of the first fitting relative to the first connector without causing axial translation of the first fitting relative to the first connector;
wherein the conduit includes a conduit flange extending radially away from the first end;
the first connector includes:
a first adapter having and first adapter flange;
a second adapter coupled with the first adapter; and
a gasket;
fluidly coupling the first connector with the conduit comprises the steps of:
positioning a ring member and a sleeve about the first end of the conduit in confronting relation to the conduit flange;
positioning the first adapter about the sleeve such that the ring member is interposed between the first adapter flange and the conduit flange; and
coupling the second adapter with the first adapter to compress the gasket between the first adapter and the second adapter to form a watertight seal.

\* \* \* \* \*